(No Model.)
L. B. FAVOR.
MULTIPLE FUSIBLE CUT-OUT.
No. 431,185. Patented July 1, 1890.
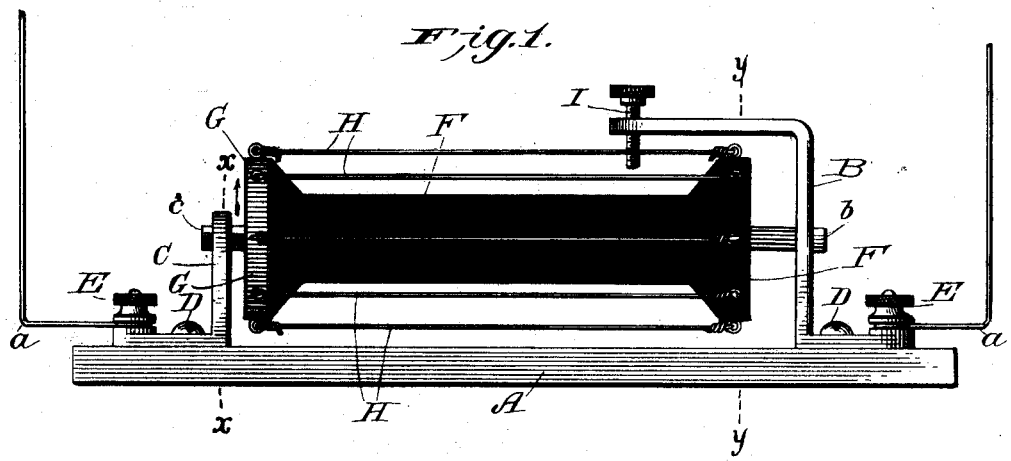
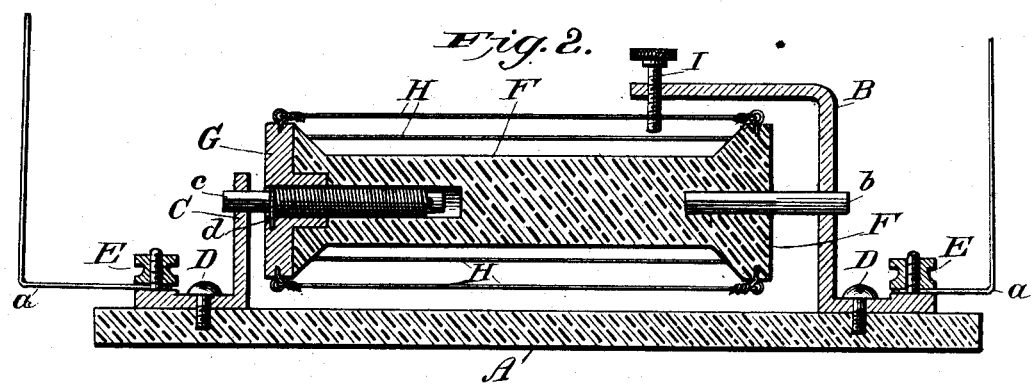
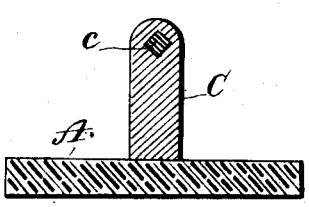
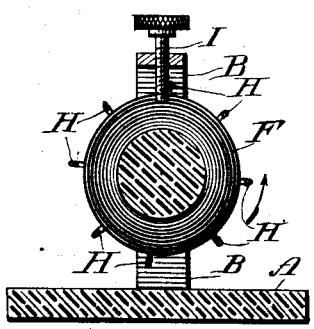
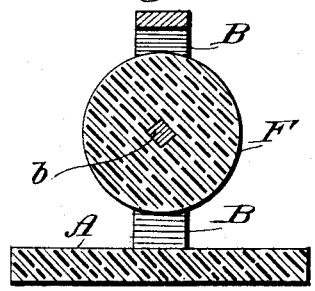
WITNESSES:
INVENTOR
Lorenzo B. Favor
BY ATT'Y

UNITED STATES PATENT OFFICE.

LORENZO B. FAVOR, OF BRIDGEPORT, CONNECTICUT, ASSIGNOR TO THE THERMAL ELECTRIC COMPANY, OF MAINE.

MULTIPLE FUSIBLE CUT-OUT.

SPECIFICATION forming part of Letters Patent No. 431,185, dated July 1, 1890.

Application filed January 18, 1890. Serial No. 337,322. (No model.)

*To all whom it may concern:*

Be it known that I, LORENZO B. FAVOR, a citizen of the United States, residing at Bridgeport, in the county of Fairfield and State of Connecticut, have invented certain new and useful Improvements in Devices for the Protection of Low-Tension Electrical Circuits; and I do hereby declare the following to be a full, clear, and exact description of the invention, such as will enable others skilled in the art to which it appertains to make and use the same.

My invention relates to certain new and useful improvements in devices for the protection of low-tension electrical circuits, and has for its object to obviate any danger or damage which might result from the accidental charging of a telephone, telegraph, or other low-tension circuit with a high-tension current. Great damage and loss of life have resulted in the past from the crossing of telephonic and telegraphic wires by electric-light currents and also from the striking of such wires by lightning. Various devices have been contrived and known as "lightning-arresters," the object whereof is to ground any abnormal charge of electricity; but said devices are designed generally, if not solely, for the protection of electric-light wires, and are sometimes never in circuit, except in instances of such abnormal charge.

My improvement does not ground any abnormal charge of electricity, is always in the circuit during the normal condition of the latter, and automatically breaks the circuit whenever a high-tension current of electricity crosses or comes in contact with the latter.

In the accompanying drawings, Figure 1 is a side elevation of my improvement; Fig. 2, a longitudinal sectional elevation; Fig. 3, a cross-section; Fig. 4, a section at the line $x\ x$ of Fig. 1, and Fig. 5 a section at the line $y\ y$ of Fig. 1.

Similar letters denote like parts in the several figures of the drawings.

A is a bed made of any non-conducting material, as wood, and B C are brackets secured to this bed by screws D. These brackets are good conductors, and are provided with binding-posts E, to which the line-wire $a$ is connected.

F is a drum of any suitable non-conducting material, as hard rubber, having at one end a short shaft $b$, rigid with said drum and adapted to revolve freely within a bearing in the bracket B. The outer end of the drum is provided with an end cap G, which is a good conductor, and the diameter of said drum is the greatest at the ends. A pin $c$ extends loosely through said cap within the drum, and around this pin is a coil-spring $d$, one end of which is secured to the pin itself, while the other end is fastened to the cap, as clearly shown at Fig. 2 of the drawings. The outer end of the pin $c$ is secured as against rotary movement within the bracket C, as is clearly shown at Fig. 4. It will thus be seen that the drum is journaled within the brackets B C, and the rotation of said drum in one direction will tighten the coils of the spring, and that the action of the latter when wound will tend to revolve the drum in the opposite direction. (Indicated by the arrows in Figs. 1 and 3.) This manner of journaling the drum is precisely in accordance with the way in which a spring-actuated shade-roller is hung, and I make no claim thereto, it being essential only in this connection that said drum should have an automatic rotary movement in the direction indicated by the arrows.

H are fusible conducting-wires, which are secured in parallelism to opposite ends of the drum, said wires being secured at one end to the non-conducting end of the drum, while the other ends of the wires are secured to the conducting-cap G. In other words, said wires at one end are insulated and at the other end are electrically connected with the bracket C through the medium of the cap G, spring $d$, and pin $c$.

The bracket B is rectangular and the horizontal portion thereof overhangs the drum and is provided with a thumb-screw I, whose lower end normally depends within the field of travel of the wires H and forms a contact-finger, so that one of said wires will always be in abutment against said finger to arrest the spring-actuated movement of the drum, as will be readily understood. The circuit is therefore closed through the brackets, the contact-screw I, the fusible wire which is in contact therewith, and the cap G.

My improvement is placed in any telephonic, telegraphic, or other low-tension electrical circuit and at any desired location, whether at a central station or at any or all intermediate points. In telephonic circuits it would be desirable to place one of my improvements in every individual station. Should lightning strike the main line, the wire H which was at that time in contact with the screw I would fuse, thereby immediately opening the circuit. As soon as the circuit is thus opened the drum will revolve until the next wire comes in contact with said screw, thus automatically closing the circuit. Should an electric-light wire become crossed with the circuit, the wires H will all fuse in succession as fast as they come in contact with the screw I, thus completely opening the circuit and of itself warning the central office that a high-tension and dangerous current is crossed with the telephonic or telegraphic current, as the case may be.

A stroke of lightning, being momentary and not of any appreciable duration, will cause but a single wire to fuse, and a complete opening of the circuit will therefore be attributable to the action of an electric-light current.

It is not necessary that a screw should be used as a contact-point for the wires, since any means interposed in the path of said wires and electrically connected with the main line will fall within the pale of my invention.

It will be observed that the distance between the contact-point and the cap G is so great as to preclude the formation of an arc.

I do not wish to be limited to the use of any particular means for electrically connecting the fusible wires with the two open ends of the line-wire, since it is essential only that said wires should complete the circuit whenever they come in contact with the point I, and I have therefore illustrated merely the preferred construction of my improvement— namely, a drum carrying a series of fusible wires, the latter being electrically connected at one extremity to one end of the main line and insulated at the other extremity, and a contact-point electrically connected to the other end of the main line.

What I claim as new, and desire to secure by Letters Patent, is—

1. The combination of the bracket C and rectangular bracket B, insulated from each other and electrically connected with the ends of the line-wire, the non-conducting drum F, journaled within said brackets, the metal cap G, secured to one end of the drum and electrically connected to the bracket C, the fusible wires secured at one end to the cap G and at the other end to the opposite head of the drum, the contact-finger extending from the horizontal portion of the bracket B within the path of the fusible wires, and means, as a spring, for imparting to said drum a rotation, substantially as shown and set forth.

2. The combination of the brackets electrically connected with the respective ends of the line-wire, the automatically-traversing non-conducting drum, and having a central portion of less diameter journaled within said brackets, the metallic cap secured to one end of said drum and electrically connected with the adjacent bracket, the fusible wires having their ends secured, respectively, to said cap and the opposite non-conducting head of the drum, and the contact-finger extended from the other bracket within the path of said fusible wires, substantially as shown, and for the purposes set forth.

In testimony whereof I affix my signature in presence of two witnesses.

LORENZO B. FAVOR.

Witnesses:
F. W. SMITH, Jr.,
J. P. FINCH.